(12) United States Patent
Takemoto et al.

(10) Patent No.: US 9,490,685 B2
(45) Date of Patent: Nov. 8, 2016

(54) AXIAL GAP MOTOR USING NON-RARE-EARTH MAGNETS

(75) Inventors: Masatsugu Takemoto, Sapporo (JP); Satoshi Ogasawara, Sapporo (JP)

(73) Assignee: National University Corporation Hokkaido University, Sapporo-shi (JP)

( * ) Notice: Subject to any disclaimer, the term of this patent is extended or adjusted under 35 U.S.C. 154(b) by 834 days.

(21) Appl. No.: 13/501,964

(22) PCT Filed: Oct. 12, 2010

(86) PCT No.: PCT/JP2010/067860
§ 371 (c)(1),
(2), (4) Date: Jul. 2, 2012

(87) PCT Pub. No.: WO2011/046108
PCT Pub. Date: Apr. 21, 2011

(65) Prior Publication Data
US 2012/0262022 A1    Oct. 18, 2012

(30) Foreign Application Priority Data

Oct. 16, 2009   (JP) .................................. 2009-239688

(51) Int. Cl.
*H02K 21/24*    (2006.01)
*H02K 1/27*     (2006.01)

(52) U.S. Cl.
CPC ............ *H02K 21/24* (2013.01); *H02K 1/2793* (2013.01); *H02K 2213/03* (2013.01)

(58) Field of Classification Search
CPC ...... H02K 21/24; H02K 1/27; H02K 1/2713; H02K 1/2793; H02K 16/04
USPC .......... 310/156.35, 156.32, 156.45, 112, 268
See application file for complete search history.

(56) References Cited

U.S. PATENT DOCUMENTS

| | | | |
|---|---|---|---|
| 2004/0232792 A1* | 11/2004 | Erfourth | 310/156.38 |
| 2006/0087188 A1* | 4/2006 | Petro et al. | 310/156.38 |
| 2011/0273034 A1* | 11/2011 | Yamamoto | H02K 21/24 310/44 |

FOREIGN PATENT DOCUMENTS

| | | |
|---|---|---|
| CN | 101107762 A | 1/2008 |
| CN | 101454961 A | 6/2009 |

(Continued)

OTHER PUBLICATIONS

Machine translation of JP 2001136721 A (May 2001).*

(Continued)

*Primary Examiner* — Michael Andrews
(74) *Attorney, Agent, or Firm* — Sughrue Mion, PLLC

(57) ABSTRACT

The problem is to provide an axial gap motor using non-rare-earth magnets, as an axial gap motor capable of suppressing reduction in magnet torque and increasing reluctance torque.
A solution to the problem is given by an axial gap motor 10, which has a rotor 11, and a pair of stators 21 arranged opposite to the rotor 11 so that the rotor 11 is sandwiched between the stators through a gap G in a direction of rotation axis 11a of the rotor 11, in which the rotor 11 has a plurality of non-rare-earth magnets 13 arranged as separated from each other along a circumferential direction around the rotation axis 11a, and a plurality of magnetic members 15 arranged through a non-magnetic member 17c or the like between the plurality of non-rare-earth magnets 13, in which the magnetic permeability of the plurality of magnetic members 15 is larger than that of the plurality of non-rare-earth magnets 13, and in which the plurality of non-rare-earth magnets 13 and the plurality of magnetic members 15 define opposite faces 11S of the rotor 11 to the pair of stators 21.

16 Claims, 13 Drawing Sheets

(56) References Cited

FOREIGN PATENT DOCUMENTS

| | | | | |
|---|---|---|---|---|
| EP | 1850451 A1 | * | 10/2007 | ............ H02K 21/24 |
| JP | 2001-136721 A | | 5/2001 | |
| JP | 2001136721 A | * | 5/2001 | ............ H02K 21/24 |
| JP | 2005-094955 A | | 4/2005 | |
| JP | 2005-130692 A | | 5/2005 | |
| JP | 2005-151725 A | | 6/2005 | |
| JP | 2006-050706 A | | 2/2006 | |
| JP | 2006-304562 A | | 11/2006 | |
| JP | 2008-199895 A | | 8/2008 | |
| JP | 2008-278649 A | | 11/2008 | |
| JP | 2009-050045 A | | 3/2009 | |
| JP | 2009-254022 A | | 10/2009 | |

OTHER PUBLICATIONS

International Preliminary Report on Patentability (IPRP) issued Jun. 7, 2012 in corresponding PCT Application PCT/JP2010/067860.

* cited by examiner

Fig.8

| Number of magnetic poles | 8 |
|---|---|
| Outside diameter of stators | 269mm |
| Inside diameter of stators | 74mm |
| Number of coil turns | 16 |
| Outside diameter of rotor | 264mm |
| Inside diameter of rotor | 90mm |
| Length of rotation axis | 155mm |
| Diameter of rotation axis | 66mm |
| Air gap | 1mm |

AXIAL GAP MOTOR USING NON-RARE-EARTH MAGNETS

CROSS REFERENCE TO RELATED APPLICATIONS

This application is a National Stage of International Application No. PCT/JP2010/067860 filed on Oct. 12, 2010, which claims priority from Japanese Patent Application No. 2009-239688, filed on Oct. 16, 2009, the contents of all of which are incorporated herein by reference in their entirety.

TECHNICAL FIELD

The present invention relates to an axial gap motor.

BACKGROUND ART

The known axial gap motors having a rotor, and a stator or stators arranged opposite to the rotor through a gap in a direction of the rotation axis of the rotor include, for example, those described in Patent Literatures 1 to 4 below.

In the axial gap motors described in Patent Literatures 1 to 4 below, the rotor has permanent magnets arranged as separated from each other in the circumferential direction around the rotation axis, and soft magnetic members arranged between these permanent magnets (soft magnetic members between permanent magnets). These Patent Literatures describe that the soft magnetic members arranged as described above cause an increase in reluctance torque and thus an increase in motor torque.

CITATION LIST

Patent Literatures

Patent Literature 1: Japanese Patent Application Laid-open No. 2006-50706
Patent Literature 2: Japanese Patent Application Laid-open No. 2008-278649
Patent Literature 3: Japanese Patent Application Laid-open No. 2008-199895
Patent Literature 4: Japanese Patent Application Laid-open No. 2005-94955

SUMMARY OF INVENTION

Technical Problem

The permanent magnets used in the rotors of the axial gap motors as described above are generally rare-earth magnets having a large remanent magnetic flux density. However, localities of rare earths such as neodymium (Nd) and dysprosium (Dy), which are raw materials of the rare-earth magnets, are localized in specific regions and the amount of use thereof has been rapidly increasing in recent years. For this reason, the rare earths have drawbacks in terms of stable supply and price.

Therefore, it can be contemplated that non-rare-earth magnets such as ferrite magnets are used instead of the rare-earth magnets, as the permanent magnets used in the rotors of the axial gap motors. However, the problem as described below will arise if the rare-earth magnets are replaced by the non-rare-earth magnets in the conventional axial gap motors.

Specifically, since the remanent magnetic flux density of the non-rare-earth magnets is smaller than that of the rare-earth magnets, the magnet torque decreases accordingly. For this reason, it is preferable to adopt an axial gap motor having a configuration capable of suppressing the reduction in magnet torque and increasing the reluctance torque. However, when the rare-earth magnets were replaced by the non-rare-earth magnets in the conventional axial gap motors, it was difficult to achieve both of them.

For example, the rotor of the axial gap motor described in Patent Literature 1 above is provided with a rotor back core of a soft magnetic material on the stator-side faces of the permanent magnets. In the rotor of the axial gap motor described in Patent Literature 2 above, each of the permanent magnets is sandwiched between a pair of magnetic bodies of a soft magnetic material in the rotation axis direction. Namely, the pair of magnetic bodies of the soft magnetic material are provided on two faces of each permanent magnet on the paired stator sides.

In the axial gap motors described in Patent Literatures 1 and 2 above, therefore, the non-rare-earth magnets become thinner because of the member or members disposed on the stator-side faces of the permanent magnets, so as to result in a failure in increasing a rate of the volume of the non-rare-earth magnets to the total volume of the rotor. As a result, because it was difficult to increase the rate of the volume of the non-rare-earth magnets to the total volume of the rotor, it was difficult to suppress the reduction in magnet torque.

Furthermore, since the member or members of the soft magnetic material are arranged on the stator-side faces of the permanent magnets, magnetic fluxes generated from the stators are attracted toward the magnetic bodies arranged on the stator-side faces of the permanent magnets. For this reason, the magnetic fluxes from one stator to the other stator do not pass only inside the soft magnetic members between permanent magnets but also pass to some extent in the permanent magnets. As a result, the reduction of the magnetic fluxes passing in the soft magnetic members between permanent magnets leads to reduction in reluctance torque and the magnetic fluxes passing in the permanent magnets, particularly, field weakening fluxes cause irreversible demagnetization of the non-rare-earth magnets, which posed the problem of reduction in magnet torque.

FIG. 1 is a drawing showing a schematic sectional view along the circumferential direction around the rotation axis, of a region near the rotor in the axial gap motor described in Patent Literature 3 above. In the axial gap motor described in Patent Literature 3 above, as shown in FIG. 1, the permanent magnets 8 of the rotor 3 are magnetized in a direction (the horizontal direction in FIG. 1) perpendicular to the rotation axis of the rotor 3. Namely, magnetic pole faces 8mS of the permanent magnets 8 are perpendicular to opposite faces 4S of the stators 4 to the rotor 3. For this reason, magnetic fluxes 8m generated from the permanent magnets 8 are directed from the permanent magnets 8 to the soft magnetic members 9 between permanent magnets and further directed from the soft magnetic members 9 between permanent magnets toward the pair of stators 4. Therefore, each soft magnetic member 9 between permanent magnets, which is magnetized by the permanent magnets 8, comes to have a pair of faces of the same pole on the sides where the pair of stators 4 are located. As a consequence, most of magnetic fluxes 4m generated from the pair of stators 4 cannot pass from one stator 4 via the soft magnetic member 9 between permanent magnets to the other stator 4, and the magnetic fluxes generated from the stators 4 return to the same stators 4. This reduces the magnetic fluxes from the stators 4 passing in the soft magnetic members 9 between permanent magnets, which raised the problem of reduction in reluctance torque.

In the axial gap motor described in Patent Literature 4 above, the permanent magnets are in direct contact with the soft magnetic members between permanent magnets, as illustrated in FIG. 4 of Patent Literature 4 above. For this reason, if the non-rare-earth magnets are used as the permanent magnets, the non-rare-earth magnets will be magnetically coupled to the soft magnetic members between permanent magnets. Since the remanent magnetic flux density of the non-rare-earth magnets is smaller than that of the rare-earth magnets, if the magnetic fluxes from the stators, particularly, field weakening fluxes pass through the soft magnetic members between permanent magnets to change the orientation of magnetization of the soft magnetic members between permanent magnets, the magnetization of the non-rare-earth magnets will also change to some extent so as to be affected by the change. As a result, the non-rare-earth magnets are subjected to irreversible demagnetization, which posed the problem of reduction in magnet torque.

The present invention has been accomplished in view of the above problem and it is an object of the present invention to provide an axial gap motor using non-rare-earth magnets as permanent magnets, as an axial gap motor capable of suppressing the reduction in magnet torque and increasing the reluctance torque.

Solution to Problem

In order to solve the above problem, an axial gap motor according to the present invention comprises a rotor, and a pair of stators arranged opposite to the rotor so that the rotor is sandwiched between the stators through a gap in a direction of a rotation axis of the rotor, wherein the rotor has a plurality of non-rare-earth magnets arranged as separated from each other along a circumferential direction around the rotation axis, and a plurality of magnetic members arranged through a non-magnetic member or a spatial gap between the plurality of non-rare-earth magnets, wherein each of magnetization directions of the plurality of non-rare-earth magnets extends along the direction of the rotation axis, wherein the magnetic permeability of the magnetic members is larger than that of the non-rare-earth magnets, and wherein the plurality of non-rare-earth magnets and the plurality of magnetic members define opposite faces of the rotor to the pair of stators.

In the axial gap motor according to the present invention, the plurality of non-rare-earth magnets and the plurality of magnetic members define the opposite faces of the rotor to the pair of stators and therefore there is no such member as the rotor back core, on the faces of the non-rare-earth magnets on the paired stator sides. For this reason, the non-rare-earth magnets are prevented from becoming thinner because of such member, which can increase a rate of the volume of the non-rare-earth magnets to the total volume of the rotor. As a result, it becomes feasible to suppress the reduction in magnet torque due to a decrease in the rate of the volume of the non-rare-earth magnets to the total volume of the rotor.

Since the magnetic permeability of the magnetic members is larger than that of the non-rare-earth magnets and there are no members made of a soft magnetic material on the faces of the non-rare-earth magnets on the paired stator sides, the magnetic fluxes generated from the stators are prevented from being attracted toward the stator-side faces of the non-rare-earth magnets. For this reason, most of the magnetic fluxes generated from one stator and directed toward the other stator do not pass through the non-rare-earth magnets, but pass in the magnetic members arranged between the non-rare-earth magnets. As a result, most of the magnetic fluxes generated from the stators are guided into the magnetic members, which can increase the reluctance torque. Furthermore, it suppresses the irreversible demagnetization of the non-rare-earth magnets due to the magnetic fluxes passing in the non-rare-earth magnets. As a result, it becomes feasible to suppress the reduction in magnet torque caused by the irreversible demagnetization of the non-rare-earth magnets due to the magnetic fluxes passing in the non-rare-earth magnets.

Furthermore, since the magnetization directions of the non-rare-earth magnets extend along the direction of the -rotation axis, the paired stator-side faces of the magnetic members are not magnetized in the same pole by the magnetic fluxes generated by the non-rare-earth magnets. For this reason, the magnetic fluxes from one stator to the other stator are not impeded from passing in the magnetic members, which does not raise the problem of reduction in reluctance torque as is caused in the case where the paired stator-side faces of the magnetic members are magnetized in the same pole.

Since the plurality of magnetic members are arranged through the non-magnetic member or the spatial gap between the non-rare-earth magnets, it is feasible to suppress magnetic coupling between the non-rare-earth magnets and the magnetic members. For this reason, even if the magnetic fluxes from the stators, particularly, field weakening fluxes pass through the magnetic members to change the orientation of magnetization of the magnetic members, the magnetization of the non-rare-earth magnets will be prevented from varying so as to be affected by the change. As a result, the irreversible demagnetization of the non-rare-earth magnets is suppressed, so as to suppress the reduction in magnet torque.

In the axial gap motor according to the present invention, as described above, it is feasible to suppress the reduction in magnet torque and to increase the reluctance torque.

Furthermore, in the axial gap motor according to the present invention, the remanent magnetic flux density of the non-rare-earth magnets is preferably not less than 200 mT and not more than 600 mT.

Furthermore, in the axial gap motor according to the present invention, the recoil permeability of the non-rare-earth magnets is preferably not less than 1.0 and not more than 2.0.

Furthermore, in the axial gap motor according to the present invention, the magnetization directions of the non-rare-earth magnets are preferably alternately inverted along the circumferential direction around the rotation axis. This allows the rotor to be efficiently rotated by rotational magnetic flux generated from the pair of stators.

Furthermore, in the axial gap motor according to the present invention, the volume of each of the non-rare-earth magnets is preferably larger than the volume of each of the magnetic members. This configuration can fully suppress the reduction in magnet torque.

Furthermore, in the axial gap motor according to the present invention, the non-rare-earth magnets can be ferrite magnets.

Advantageous Effects of Invention

The present invention provides the axial gap motor using the non-rare-earth magnets as permanent magnets, as the axial gap motor capable of suppressing the reduction in magnet torque and increasing the reluctance torque.

BRIEF DESCRIPTION OF DRAWINGS

FIG. 8 is a drawing showing various conditions in an example used in analysis.

DESCRIPTION OF EMBODIMENTS

Figure 1:
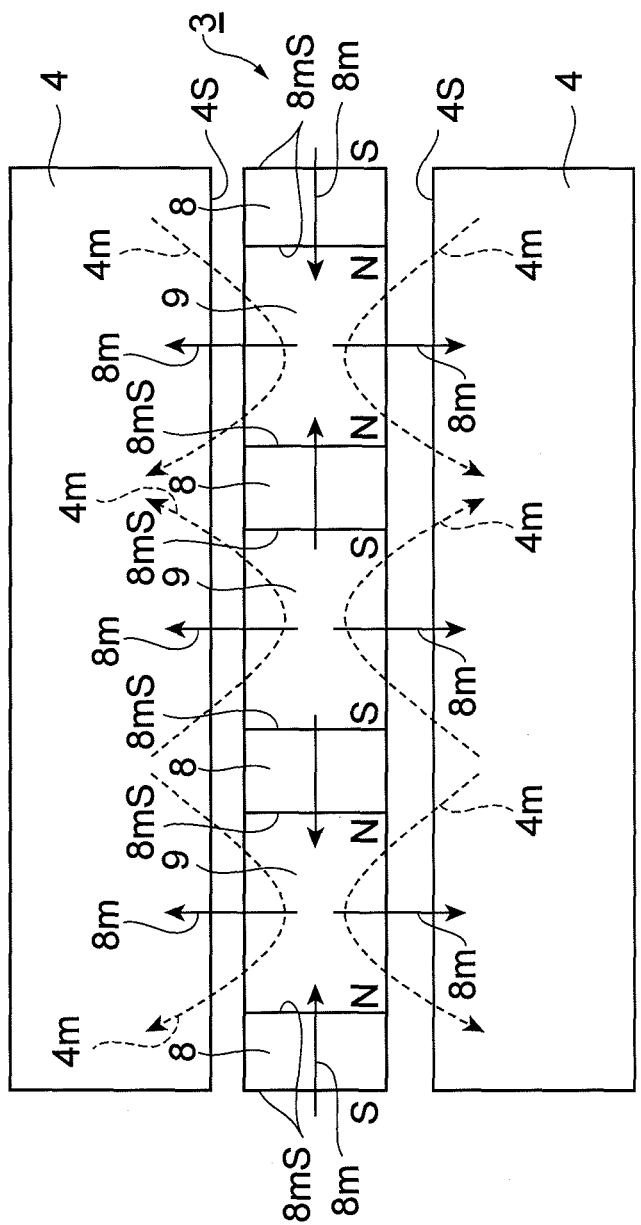
FIG. 1 is a drawing showing a schematic sectional view along the circumferential direction around the rotation axis, of the region near the rotor in the conventional axial gap motor.

An axial gap motor according to an embodiment will be described below in detail with reference to the accompanying drawings. In the drawings the same elements will be denoted by the same reference signs as much as possible. It is noted that dimensional ratios in components and between components in the drawings each are arbitrary, for easier viewing of the drawings.

Figure 2:
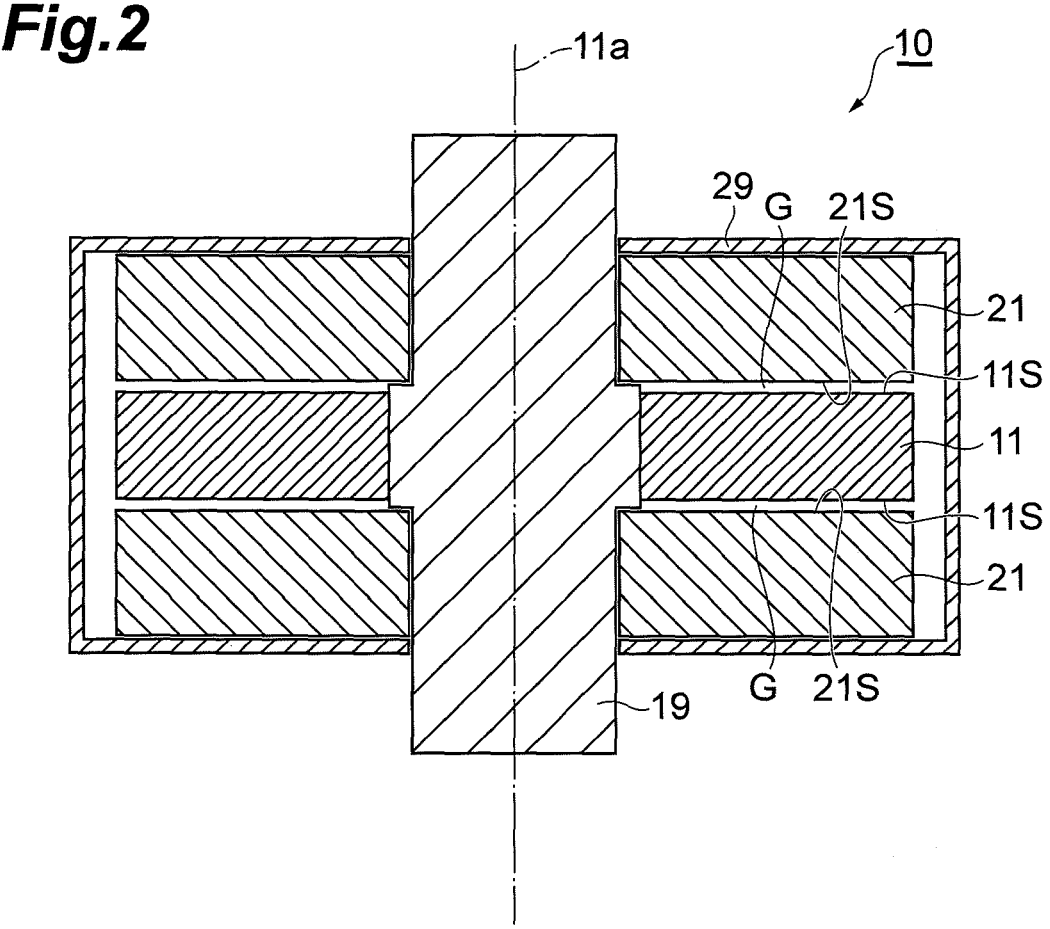
FIG. 2 is a drawing schematically showing a cross-sectional configuration of an axial gap motor according to an embodiment.

FIG. 2 is a drawing schematically showing a cross-sectional configuration of the axial gap motor according to the present embodiment. As shown in FIG. 2, the axial gap motor 10 of the present embodiment is provided with a rotor 11, a pair of stators 21, a rotor shaft 19, and a case 29.

The rotor 11 is a cylindrical member, which is a member configured to rotate around a rotation axis 11a extending along a center line of the cylindrical shape thereof. The rotor shaft 19 penetrates the rotor 11 and the rotor 11 is fixed to the rotor shaft 19 on its inner periphery. The rotor shaft 19 is a member extending in a direction along the rotation axis 11a, i.e., in a height (thickness) direction of the rotor 11, which defines the rotation axis 11a.

Each of the pair of stators 21 is a cylindrical member. The pair of stators 21 are arranged opposite to the rotor 11 so that the rotor 11 is sandwiched between the stators through a gap G (spatial gap) in the direction of the rotation axis 11a of the rotor 11. Namely, opposite faces 21S of the pair of stators 21 are arranged opposite to opposite faces 11S of the rotor 11.

The rotor shaft 19 penetrates the pair of stators 21 and inner peripheries of the pair of stators 21 are not fixed to the rotor shaft 19.

The case 29 is a member which houses the rotor 11 and the pair of stators 21 inside. The case 29 supports the rotor shaft 19 in a rotatable state through bearings or the like. The pair of stators 21 are fixed to the case 29.

The rotor 11 and stators 21 will be described below in more detail.

Figure 3:
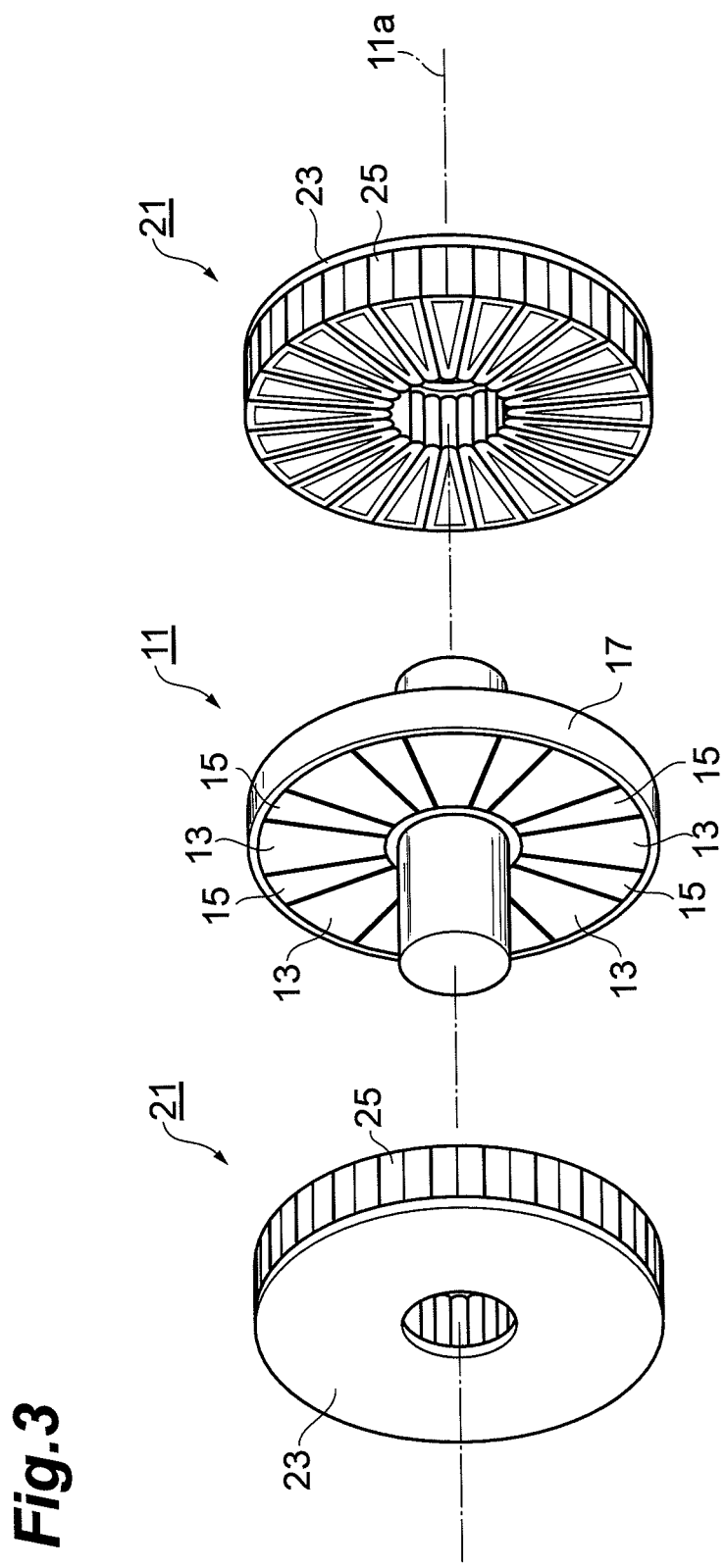
FIG. 3 is a perspective view showing a state in which a rotor and a pair of stators are separated from each other in the direction of the rotation axis.
Figure 4:
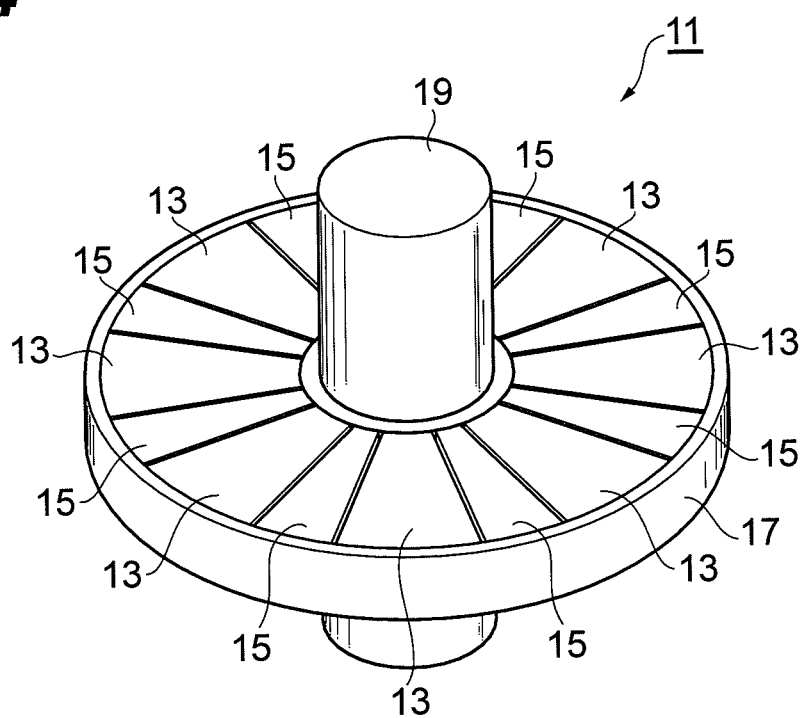
FIG. 4 is a perspective view showing the rotor.

FIG. 3 is a perspective view showing a state in which the rotor and the pair of stators are separated from each other in the direction of the rotation axis, and FIG. 4 is a perspective view showing the rotor.

As shown in FIGS. 3 and 4, the rotor 11 has a plurality of non-rare-earth magnets 13 arranged as separated from each other along the circumferential direction around the rotation axis 11a, a plurality of magnetic members 15 arranged between the plurality of non-rare-earth magnets 13, and a frame member 17 for fixing the non-rare-earth magnets 13, the magnetic members 15, and the rotor shaft 19 to each other.

The plurality of non-rare-earth magnets 13 are permanent magnets except for rare-earth magnets, e.g., ferrite magnets or alnico magnets. The number of non-rare-earth magnets 13 is eight in the present embodiment, but there are no particular restrictions thereon. Each of magnetization directions of the non-rare-earth magnets 13 extends along the rotation axis 11a. In the present embodiment, the magnetization directions of the non-rare-earth magnets 13 are alternately inverted along the circumferential direction around the rotation axis 11a. In the present embodiment each of the non-rare-earth magnets 13 has the thickness in the direction along the rotation axis 11a and is formed in an arc band shape extending in a direction perpendicular to the rotation axis 11a and having a center point in the rotation axis 11a.

The plurality of magnetic members 15, like the non-rare-earth magnets 13, have the thickness in the direction along the rotation axis 11a and are formed each in an arc band shape extending in a direction perpendicular to the rotation axis 11a and having a center point in the rotation axis 11a. The number of magnetic members 15 is eight in the present embodiment, but there are no particular restrictions thereon. The magnetic permeability of the magnetic members 15 is larger than that of the non-rare-earth magnets 13. The magnetic members 15 are comprised of a magnetic material such as iron, e.g., dust core or S45C, or a magnetic material for electric equipment.

Furthermore, the plurality of non-rare-earth magnets 13 and the plurality of magnetic members 15 define the opposite faces 11S (cf. FIG. 2) of the rotor 11 to the pair of stators 21.

As shown in FIG. 3, each of the paired stators 21 has a stator core 23 comprised of a soft magnetic material, and coil parts 25. The stator core 23 has a cylindrical member, and a plurality of teeth projecting from the cylindrical member toward the rotor 11. A cross section of each of the teeth along a plane perpendicular to the rotation axis 11a is, for example, an arc band shape. The coil parts 25 are wound around the respective teeth. The coil parts 25, when energized, generate rotational magnetic flux in the direction along the rotation axis 11a, in a region between one stator 21 and the other stator 21. Torque caused by this rotational flux makes the rotor 11 rotate around the rotation axis 11a.

Figure 5:
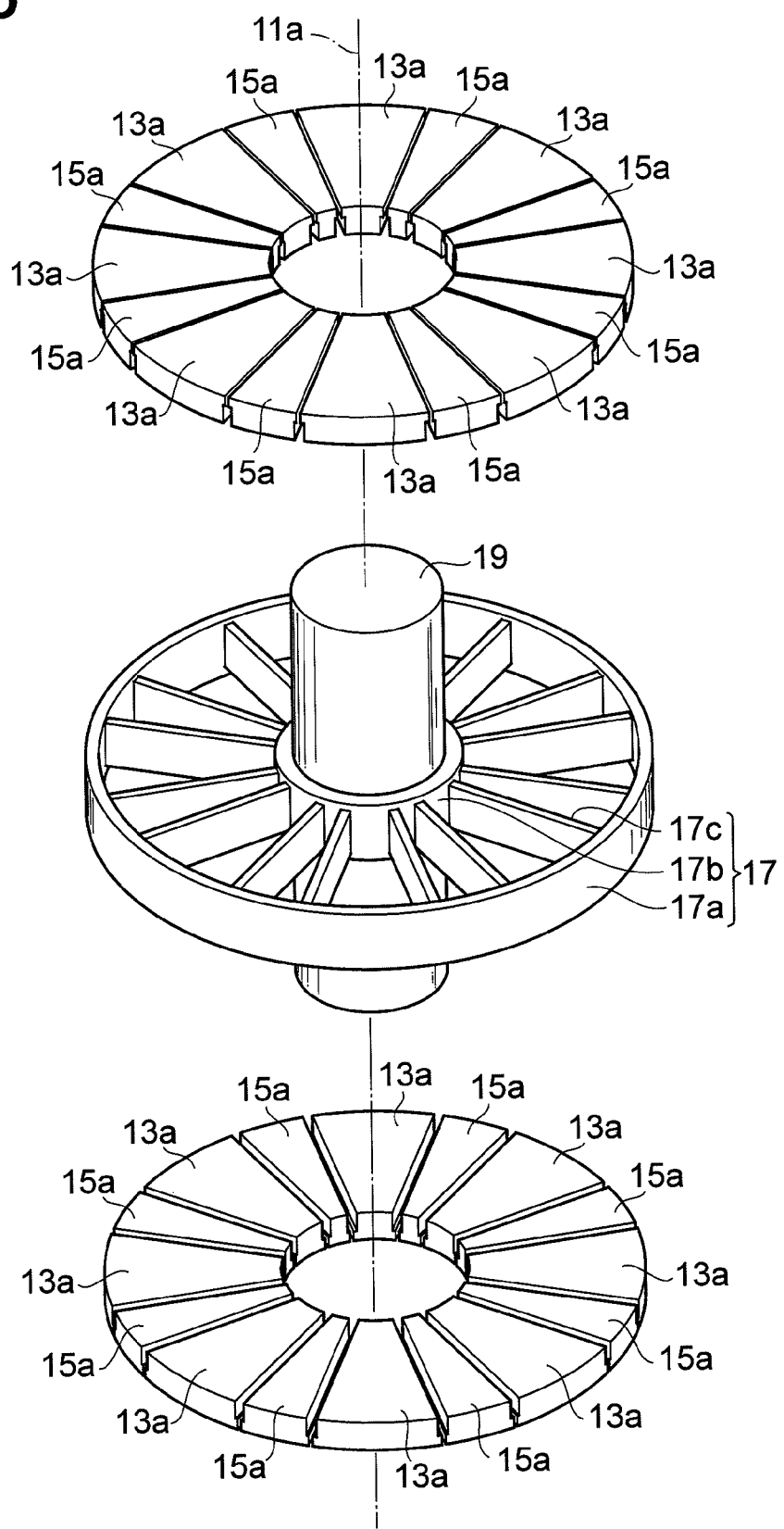
FIG. 5 is a drawing showing configurations of elements of non-rare-earth magnets, a frame member, and a rotor shaft.

FIG. 5 is a drawing showing configurations of elements of the non-rare-earth magnets, the frame member, and the rotor shaft. FIG. 5 shows a state in which the frame member 17 and the rotor shaft 19 are separated from the other members in the direction along the rotation axis 11a.

The frame member 17 is comprised of a non-magnetic material such as stainless steel. As shown in FIG. 5, the frame member 17 has a ring-shaped member 17a defining an external shape of the rotor 11, a rotor shaft fixing member 17b fixing the rotor shaft 19, and a plurality of separators 17c extending from the ring-shaped member to the rotor shaft fixing member and lying between the non-rare-earth magnets 13 and the magnetic members 15 so as to separate them from each other. In the present embodiment, as shown in FIG. 5, each of the non-rare-earth magnets 13 consists of a pair of non-rare-earth magnet elements 13a disposed on the upper side and on the lower side, respectively, of the rotation axis 11a. Similarly, each of the magnetic members 15 consists of a pair of magnetic member elements 15a disposed on the upper side and on the lower side, respectively, of the rotation axis 11a. The non-rare-earth magnet elements 13a and the magnetic member elements 15a disposed on the upper side of the rotation axis 11a are inserted from the top of the frame member 17 into regions defined by the ring-shaped member 17a, the rotor shaft fixing member 17b, and the separators 17c. Likewise, the non-rare-earth magnet elements 13a and the magnetic member elements 15a disposed on the lower side of the rotation axis 11a are inserted from the bottom of the frame member 17 into regions defined by the ring-shaped member 17a, the rotor shaft fixing member 17b, and the separators 17c.

It is noted that each non-rare-earth magnet 13 does not always have to be composed of a pair of non-rare-earth magnet elements 13a, but may be composed of a single member. Each magnetic member 15 does not always have to be composed of a pair of magnetic member elements 15a, but may be composed of a single member.

Figure 6:
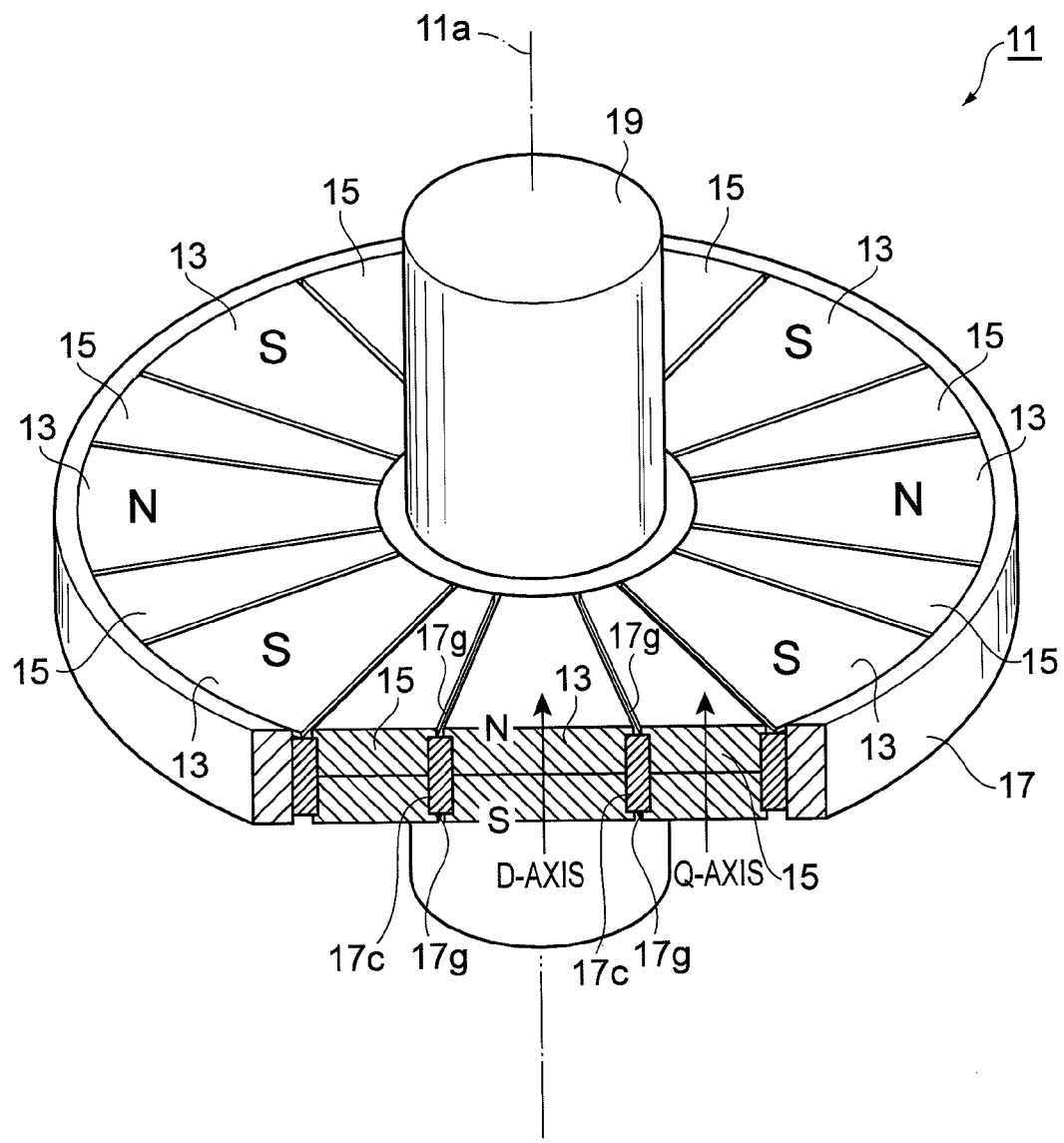
FIG. 6 is a perspective view showing the rotor.

FIG. 6 is a perspective view showing the rotor. In FIG. 6, there are provided signs (N and S) indicative of the magnetization directions of the non-rare-earth magnets 13 and there is shown a state in which the non-rare-earth magnets 13, the magnetic members 15, and the frame member 17 are cut in part by a plane parallel to the rotation axis 11a.

As shown in FIG. 6, the non-rare-earth magnets 13 and the magnetic members 15 are separated from each other. More specifically, the plurality of magnetic members 15 are provided through the separators 17c as non-magnetic members and spatial gaps 17g between the plurality of non-rare-earth magnets 13. Namely, there are the separators 17c and spatial gaps 17g lying between the non-rare-earth magnets 13 and the magnetic members 15.

In the present embodiment the spatial gaps 17g exist on the upper side and on the lower side in the direction along the rotation axis 11a between each non-rare-earth magnet 13 and each magnetic member 15 and the separator 17c exists between them, but it is also possible to adopt, for example, a configuration wherein the separators 17c exit on the upper side and on the lower side in the direction along the rotation axis 11a and the spatial gap 17g exists between them. In the present embodiment there are both of the separator 17c and spatial gaps 17g lying between each non-rare-earth magnet 13 and each magnetic member 15, but it is also possible to adopt a configuration wherein only the separator 17c lies or a configuration wherein only the spatial gap 17g lies. The separation distance along the circumferential direction around the rotation axis 11a between each adjacent pair of non-rare-earth magnet 13 and magnetic member 15 (i.e., the width of the separator 17c and/or the spatial gaps 17g along the circumferential direction around the rotation axis 11a) is preferably larger than the width of the gap G (cf. FIG. 2) between the rotor 11 and the stators 21 in the direction along the rotation axis 11a. The reason for it is that when this condition is met, the motor can have a particularly significant effect that magnetic fluxes of the non-rare-earth magnets 13 are linearly directed along the rotation axis 11a toward the stators 21.

Furthermore, as shown in FIG. 6, the magnetization directions of the non-rare-earth magnets 13 are preferably alternately inverted along the circumferential direction around the rotation axis 11a. This allows the rotor 11 to be efficiently rotated by the rotational magnetic flux generated from the pair of stators 21.

In the case of the axial gap motor 10 of the present embodiment as described above, it becomes feasible to suppress the reduction in magnet torque and to increase the reluctance torque, for the reasons as described below.

Figure 7:
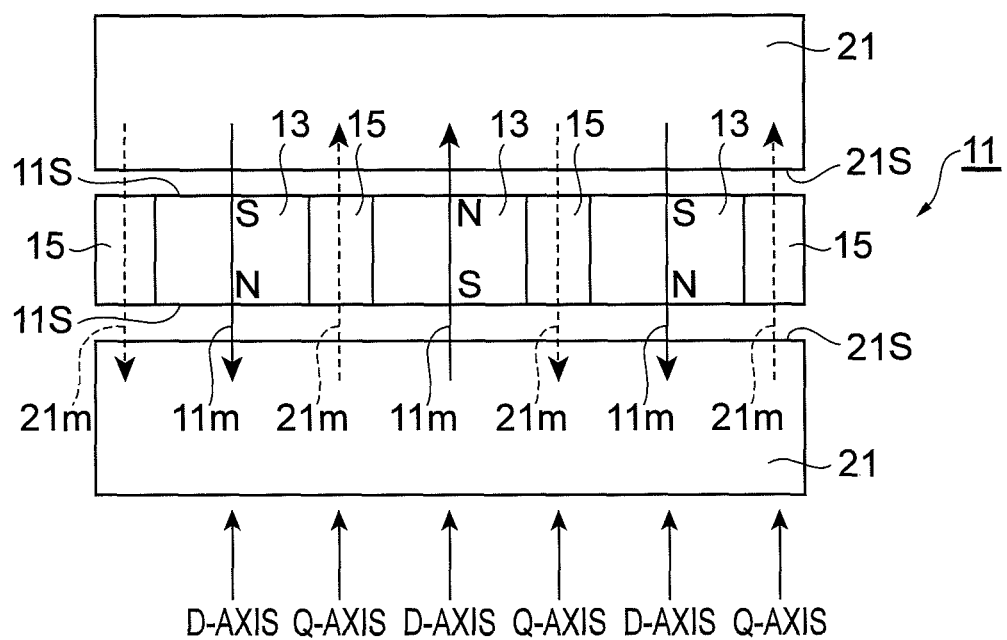
FIG. 7 is a drawing showing a schematic sectional view along the circumferential direction around the rotation axis, of a region near the rotor in the axial gap motor of the embodiment.

FIG. 7 is a drawing showing a schematic cross section along the circumferential direction around the rotation axis, of a region near the rotor in the axial gap motor of the present embodiment.

In the axial gap motor 10 of the present embodiment, as shown in FIG. 7, the plurality of non-rare-earth magnets 13 and the plurality of magnetic members 15 define the opposite faces 11S of the rotor 11 to the pair of stators 21, and therefore there is no such member as the rotor back core, on the paired faces of the non-rare-earth magnets 13 on the magnetic member 15 sides (or on parts of the opposite faces 11S). For this reason, the non-rare-earth magnets 13 are prevented from becoming thinner because of such member, which can increase the rate of the volume of the magnetic members 15 to the total volume of the rotor 11. As a consequence, it becomes feasible to suppress the reduction in magnet torque caused by decrease in the rate of the volume of the non-rare-earth magnets 13 to the total volume of the rotor 11.

Since the magnetization directions of the non-rare-earth magnets 13 extend along the direction of the rotation axis 11a, the faces of the magnetic members 15 on the paired stator 21 sides (parts of the opposite faces 11S) are not magnetized in the same pole by magnetic fluxes 11m generated by the non-rare-earth magnets 13. For this reason, magnetic fluxes 21m from one stator 21 to the other stator 21 are not impeded from passing in the magnetic members 15, which does not raise the problem of reduction in reluctance torque as is caused if the faces of the magnetic members 15 on the paired stator 21 sides are magnetized in the same pole.

Since the magnetic permeability of the magnetic members 15 is larger than that of the non-rare-earth magnets 13 and there are no members of a soft magnetic material on the faces of the non-rare-earth magnets 13 on the paired stator 21 sides (or on parts of the opposite faces 11S), the magnetic fluxes 21m generated from the stators 21 are prevented from being attracted toward the faces of the non-rare-earth magnets 13 on the sides where the stators 21 are located. (If there is a member of a soft magnetic material such as the rotor back core in a region intersecting with d-axes and q-axes, on the faces of the non-rare-earth magnets 13 on the paired stator 21 sides, the magnetic fluxes 21m generated from the stators 21 will be attracted toward the faces of the non-rare-earth magnets 13 on the stator 21 sides, i.e., toward the d-axes.)

For this reason, most of the magnetic fluxes 21m generated from one stator 21 and directed toward the other stator 21 pass in the magnetic members 15 disposed between the non-rare-earth magnets 13, without passing through the non-rare-earth magnets 13. As a consequence, most of the magnetic fluxes 21m generated from the stators 21 are guided into the magnetic members 15 and therefore it is feasible to increase the reluctance torque. Furthermore, it also suppresses the irreversible demagnetization of the non-rare-earth magnets 13 due to magnetic fluxes passing in the non-rare-earth magnets 13. As a result, it becomes feasible to suppress the reduction in magnet torque caused by the irreversible demagnetization of the non-rare-earth magnets 13 due to the magnetic fluxes passing in the non-rare-earth magnets 13.

In the axial gap motor 10 of the present embodiment, as described above, it becomes feasible to suppress the reduction in magnet torque and to increase the reluctance torque.

In the axial gap motor 10 of the present embodiment, the remanent magnetic flux density of the non-rare-earth magnets 13 is preferably not less than 200 mT and not more than 600 mT. It is, however, noted that the axial gap motor 10 can achieve the aforementioned effects even if the remanent magnetic flux density of the non-rare-earth magnets 13 is off the foregoing range.

In the axial gap motor 10 of the present embodiment, the recoil permeability of the non-rare-earth magnets 13 is preferably not less than 1.0 and not more than 2.0. It is, however, noted that the axial gap motor 10 can achieve the foregoing effects even if the recoil permeability of the non-rare-earth magnets 13 is off the foregoing range.

Furthermore, in the axial gap motor 10 of the present embodiment, the volume of each of the non-rare-earth magnets 13 is preferably larger than the volume of each of the magnetic members 15 (cf. FIGS. 3 to 7). This makes it feasible to fully suppress the reduction in magnet torque.

In the foregoing embodiment the rotor 11 has only the non-rare-earth magnets like the non-rare-earth magnets 13 as permanent magnets for generating the magnet torque (cf. FIGS. 3 to 6), but the present invention is not limited to this configuration. For example, the rotor 11 may have rare-earth magnets, in addition to the non-rare-earth magnets, as permanent magnets for generating the magnet torque.

The axial gap motor 10 of the present embodiment is applicable, for example, to automobiles such as hybrid cars and electric cars, and household electrical appliances such as air conditioners, refrigerators, and washing machines.

Figure 9:
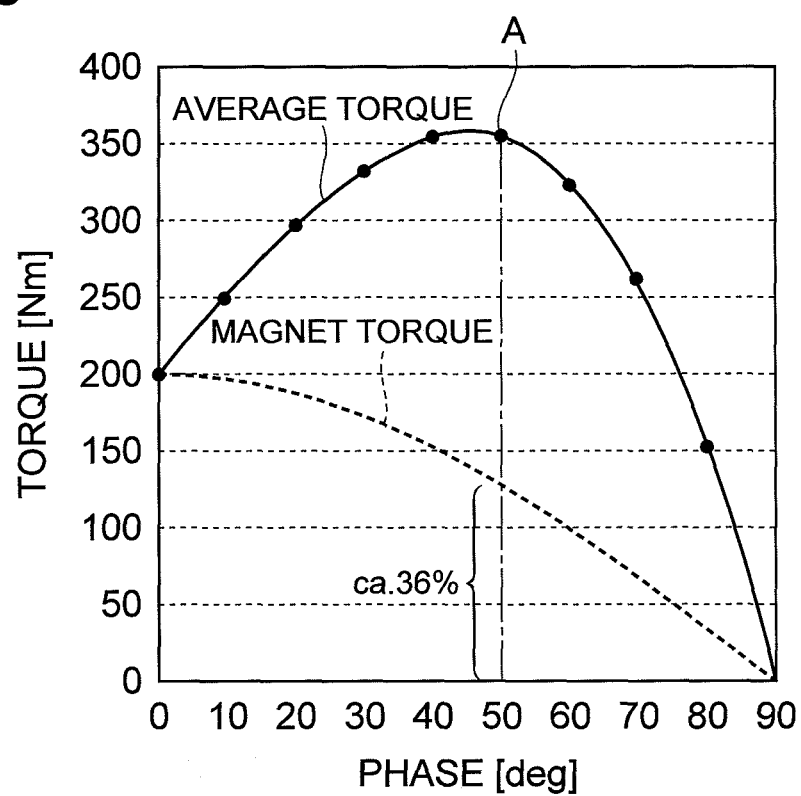
FIG. 9 is a drawing showing the analysis result of change in average torque.

Next, with an axial gap motor of an example, investigation was conducted to check change in average torque in execution of 3D-FTA with change in current phase from 0° (0 deg) to 90° (90 deg) under the conditions of the constant magnet temperature of 75° C. and the constant rated current density of 22 Arms/mm². FIG. 8 is a drawing showing the various conditions in the example used in the present analysis. FIG. 9 shows current phase angle dependences of average torque and magnet torque of the example, based on the foregoing analysis. As shown in FIG. 9, a maximum of average torque was the value at plot A, i.e., 355.0 Nm at the current phase angle of 50° (50 deg). The torque density at this point was 40.3 Nm/L, which fully meets a practical level. This verified that the prescribed rate could be lowered to about 1350 rpm, for example, in order to achieve the power density of 5.68 kW/L, i.e., the output of 50.2 kW.

FIG. 9 also shows rough change of magnet torque on the basis of the average torque at the current phase angle of 0° (0 deg). As shown in FIG. 9, it was found that at the current phase angle of 50° to provide the maximum average torque, a percentage of magnet torque in average torque was about 36% and a percentage of reluctance torque in average torque about 64%. It was confirmed by this result that the reluctance torque was dominant in the average torque of the axial gap motor of the example and that the reluctance torque was effectively utilized.

Figure 10:
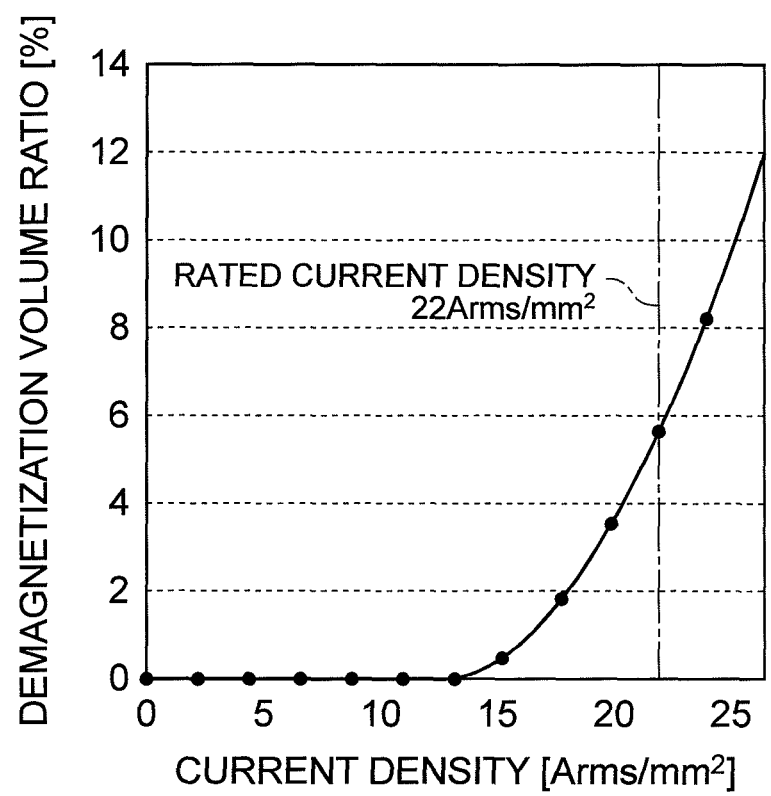
FIG. 10 is a drawing showing the analysis result of current density dependence of demagnetization volume ratio of ferrite magnets in the rotor.

FIG. 10 is a drawing showing the analysis result of current density dependence of demagnetization volume ratio of the ferrite magnets in the rotor, based on the foregoing analysis. The demagnetization volume ratio is a value indicative of a percentage of portions where irreversible demagnetization occurred, to the entire magnets. This analysis was performed with change in current density, under the conditions of the constant rotation angle of 0° and the constant current phase angle of 90° most likely to cause the irreversible demagnetization. Furthermore, the temperature of the ferrite magnets was fixed at −20° C. because the ferrite magnets are readily subjected to irreversible demagnetization at low temperatures.

As shown in FIG. 10, little irreversible demagnetization occurred at low current densities. The demagnetization volume ratio at the rated current density of 22 Arms/mm² was about 5.6%. It was found in the example that only slight irreversible demagnetization occurred even in the case where the ferrite magnets likely to suffer irreversible demagnetization were used as permanent magnets of the core and where the large electric current of 22 Arms/mm² was allowed to flow in the low temperature state.

Next, with axial gap motors of examples, investigation was conducted to check a relation between the number of slots (the number of coil parts 25 in the stators 21) and reduction rate of U-phase interlinkage magnetic flux caused by irreversible demagnetization of the non-rare-earth magnets 13.

Specifically, the axial gap motors were prepared as three examples in which the number of slots was 15, 18, or 24. The shapes of the stator cores 23 and the coil parts 25 of the stators 21 were determined so as to achieve the same total of turns of coils in these examples. As a result, the numbers of turns (coil turns) in the axial gap motors of the examples with the number of slots being 15, 18, and 24 were 20, 17, and 13, respectively. The pole number (the number of non-rare-earth magnets 13 in the rotor 11) was 10 in all of the three examples.

With these examples, the analysis about demagnetization was conducted under the conditions of the constant rotation angle of 0 deg, the constant rated current density of 22 Arms/mm², the magnet temperature of −20° C. or 75° C., and the constant current phase angle of 90 deg, and reduction rates of U-phase interlinkage magnetic flux were determined.

Figure 11:
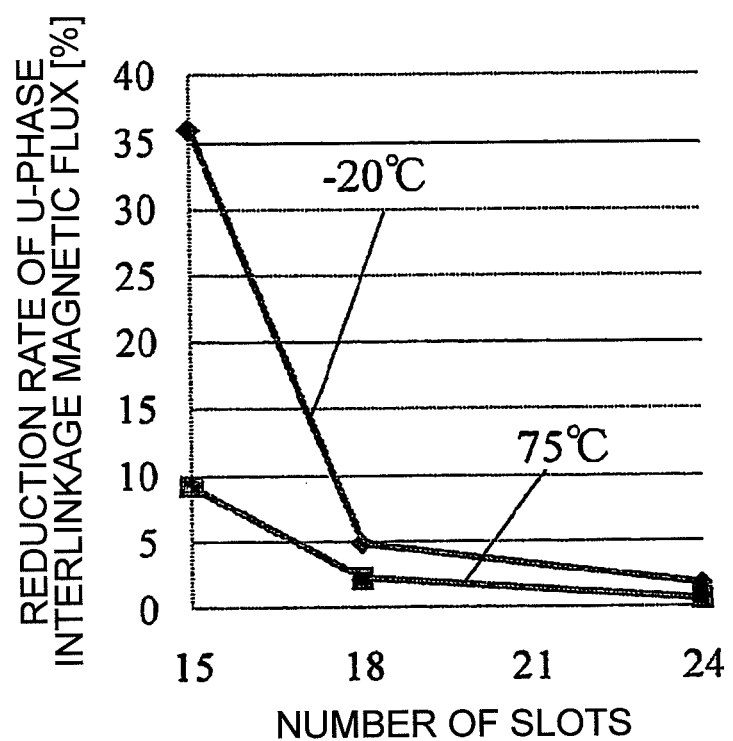
FIG. 11 is a drawing showing a relation of the number of slots to reduction rate of U-phase interlinkage magnetic flux.

FIG. 11 is a drawing showing a relation of the number of slots to reduction rate of U-phase interlinkage magnetic flux. As shown in FIG. 11, the reduction rate of U-phase interlinkage magnetic flux decreased with increase in the number of slots, in the examples in which the number of slots was in the range of 15 to 24. When the magnet temperature was −20° C., the reduction rate of U-phase interlinkage magnetic flux in the example with the number of slots being 18 was about 4.9% and the reduction rate of U-phase interlinkage magnetic flux in the example with the number of slots being 25 was about 1.7%. This verified that resistance to irreversible demagnetization increased with increase in the number of slots, in the examples in which the number of slots was in the range of 15 to 24.

Next, with axial gap motors of examples, a relation of the number of turns to average torque was investigated with the number of slots being fixed to 24.

Specifically, the axial gap motors were prepared as six examples in which the number of turns was 13, 14, 15, 16, 17, or 18. The number of slots was 24 in all of the six examples. The pole number was 10 in all of the six examples.

With these examples, the analysis about average torque was conducted under the conditions of the constant magnet temperature of 75° C., the constant rated current density of 22 Arms/mm$^2$, and the constant current phase angle of 40 deg.

Figure 12:
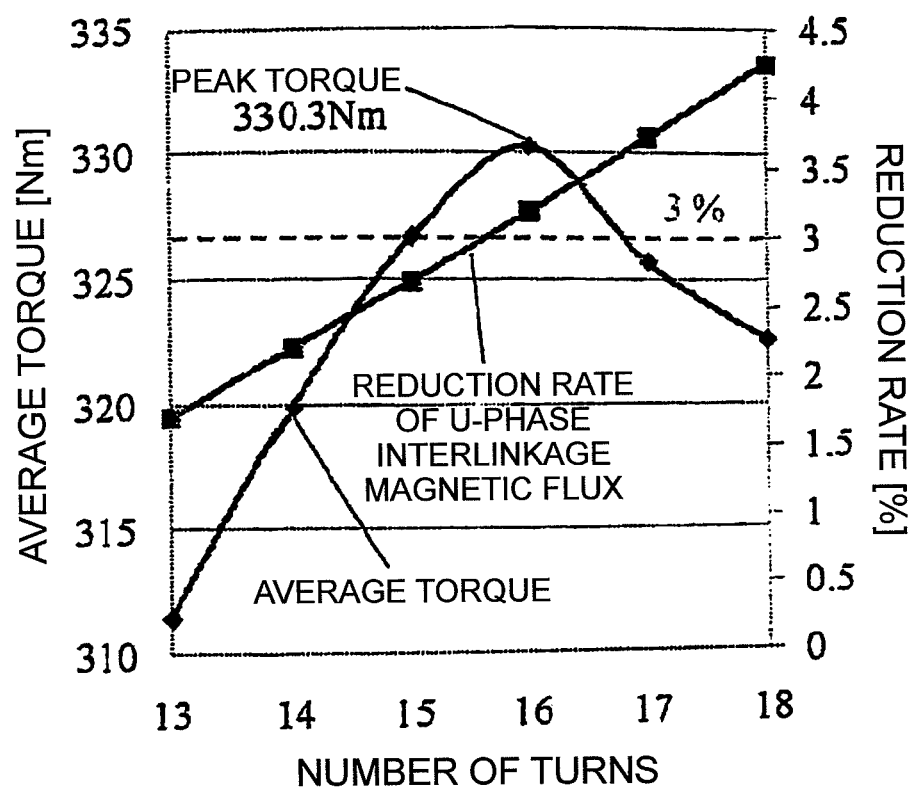
FIG. 12 is a drawing showing a relation of the number of turns to average torque and reduction rate of U-phase interlinkage magnetic flux.

FIG. 12 is a drawing showing a relation of the number of turns to average torque and reduction rate of U-phase interlinkage magnetic flux, for the axial gap motors of examples. As shown in FIG. 12, the average torque showed a maximum (330.3 Nm) when the number of turns was 16. The reduction rate of U-phase interlinkage magnetic flux increased with increase in the number of turns. When the number of turns was 15, the average torque was sufficiently large and the reduction rate of U-phase interlinkage magnetic flux was a very small value of 2.7%. It was found from these results that the optimum number of turns was 15, in view of both of the average torque and the reduction rate of U-phase interlinkage magnetic flux.

Next, with axial gap motors of examples, investigation was conducted to check a relation of the width of the non-rare-earth magnets 13 in the direction along the circumferential direction around the rotation axis 11a, to the magnitude of torque and torque ripple.

Specifically, the axial gap motors were prepared as eight examples in which the width of the non-rare-earth magnets 13 (the width of the non-rare-earth magnets 13 in the direction along the circumferential direction around the rotation axis 11a) was changed at intervals of 1.2 deg from 18 deg to 26.4 deg. The number of slots was 24 in all of the eight examples. The number of turns was 15 in all of the eight examples. The pole number was 10 in all of the eight examples.

With these examples, the analysis about average torque was conducted under the conditions of the constant magnet temperature of 75° C., the constant rated current density of 22 Arms/mm$^2$, and the constant current phase angle of 40 deg.

Figure 13:
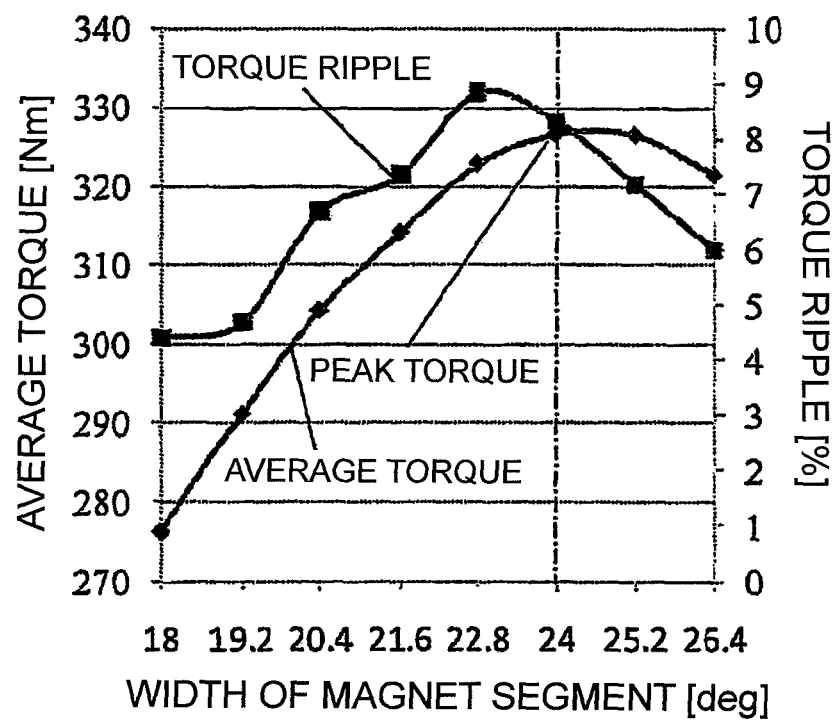
FIG. 13 is a drawing showing a relation of the width of non-rare-earth magnets to average torque and torque ripple.

FIG. 13 is a drawing showing a relation of the width of the non-rare-earth magnets to the average torque and torque ripple, for the axial gap motors of examples. As shown in FIG. 12, the torque ripple showed very small values of less than 9%, in the range where the width of the non-rare-earth magnets was from 18 deg to 26.4 deg. Furthermore, the average torque had a maximum value when the width of the non-rare-earth magnets was 24 deg. It was found from these results that the optimum width of the non-rare-earth magnets was 24 deg.

LIST OF REFERENCE SIGNS 10 axial gap motor; 11 rotor; 11S opposite faces of rotor to stators; 13 non-rare-earth magnets; 15 magnetic members; 17c non-magnetic members (separators); 17g spatial gaps; 21 stators; G gap.

The invention claimed is:

1. An axial gap motor comprising:
a rotor; and
a pair of stators arranged opposite to the rotor so that the rotor is sandwiched between the stators through a gap in a direction of a rotation axis of the rotor,
wherein the rotor has:
a plurality of non-rare-earth magnets arranged as separated from each other along a circumferential direction around the rotation axis; and
a plurality of magnetic members arranged through a spatial gap between the plurality of non-rare-earth magnets,
wherein each of magnetization directions of the plurality of non-rare-earth magnets extends along the direction of the rotation axis,
wherein a magnetic permeability of the plurality of magnetic members is larger than that of the plurality of non-rare-earth magnets,
wherein the plurality of non-rare-earth magnets and the plurality of magnetic members define opposite faces of the rotor to the pair of stators, and
wherein no elements are disposed within the spatial gap.

2. The axial gap motor according to claim 1, wherein a remanent magnetic flux density of the plurality of non-rare-earth magnets is not less than 200 mT and not more than 600 mT.

3. The axial gap motor according to claim 2, wherein a recoil permeability of the plurality of non-rare-earth magnets is not less than 1.0 and not more than 2.0.

4. The axial gap motor according to claim 2, wherein magnetization directions of the plurality of non-rare-earth magnets are alternately inverted along the circumferential direction around the rotation axis.

5. The axial gap motor according to claim 2, wherein a volume of each of the plurality of non-rare-earth magnets is larger than a volume of each of the plurality of magnetic members.

6. The axial gap motor according to claim 2, wherein the non-rare-earth magnets are ferrite magnets.

7. The axial gap motor according to claim 1, wherein a recoil permeability of the plurality of non-rare-earth magnets is not less than 1.0 and not more than 2.0.

8. The axial gap motor according to claim 7, wherein previously presented magnetization directions of the plurality of non-rare-earth magnets are alternately inverted along the circumferential direction around the rotation axis.

9. The axial gap motor according to claim 7, wherein a volume of each of the plurality of non-rare-earth magnets is larger than a volume of each of the plurality of magnetic members.

10. The axial gap motor according to claim 7, wherein the non-rare-earth magnets are ferrite magnets.

11. The axial gap motor according to claim 1, wherein magnetization directions of the plurality of non-rare-earth magnets are alternately inverted along the circumferential direction around the rotation axis.

12. The axial gap motor according to claim 11, wherein a volume of each of the plurality of non-rare-earth magnets is larger than a volume of each of the plurality of magnetic members.

13. The axial gap motor according to claim 11, wherein the non-rare-earth magnets are ferrite magnets.

14. The axial gap motor according to claim 1, wherein a volume of each of the plurality of non-rare-earth magnets is larger than a volume of each of the plurality of magnetic members.

15. The axial gap motor according to claim 14, wherein the non-rare-earth magnets are ferrite magnets.

16. The axial gap motor according to claim 1, wherein the non-rare-earth magnets are ferrite magnets.

* * * * *